United States Patent [19]
Weidinger et al.

[11] Patent Number: 5,407,047
[45] Date of Patent: Apr. 18, 1995

[54] ARRANGEMENT FOR SECURING A CLUTCH TO A CRANKSHAFT

[75] Inventors: Reinhold Weidinger, Unterspiesheim; Reiner Weisenberger, Maibach, both of Germany

[73] Assignee: Fichtel & Sachs AG, Schweinfurt, Germany

[21] Appl. No.: 101,466

[22] Filed: Aug. 2, 1993

[30] Foreign Application Priority Data

Aug. 5, 1992 [DE] Germany .......... 42 25 877.4
Jul. 13, 1993 [DE] Germany .......... 43 23 392.9

[51] Int. Cl.$^6$ .......... F16D 1/09; F16D 13/60
[52] U.S. Cl. .......... 192/70.13; 192/70.16; 192/DIG. 1; 74/572; 403/370; 403/371
[58] Field of Search .......... 192/70.13, 70.16, 110 S, 192/DIG. 1; 74/572; 403/368, 370, 371

[56] References Cited

U.S. PATENT DOCUMENTS

| | | | |
|---|---|---|---|
| 963,935 | 7/1910 | Parker | 403/370 X |
| 1,491,342 | 4/1924 | Eckhardt | 403/370 |
| 2,446,854 | 8/1948 | Schroeder | 192/70.13 |
| 3,776,651 | 12/1973 | Peter et al. | 403/370 X |
| 3,836,272 | 9/1974 | Duer | |
| 4,600,092 | 7/1986 | Billet et al. | |
| 4,615,640 | 10/1986 | Hosokawa | 403/370 X |
| 4,668,116 | 5/1987 | Ito | 403/371 X |

FOREIGN PATENT DOCUMENTS

| | | |
|---|---|---|
| 2526104 | 11/1983 | France . |
| 2501513 | 7/1976 | Germany . |
| 3315232 | 11/1983 | Germany . |
| 3838307 | 5/1990 | Germany .......... 192/70.13 |
| 4013298 | 10/1991 | Germany . |
| 4117571 | 12/1991 | Germany . |
| 9016961 | 5/1992 | Germany . |
| 1412076 | 10/1975 | United Kingdom . |
| 2119039 | 11/1983 | United Kingdom . |
| 2228060 | 8/1990 | United Kingdom . |
| 2243666 | 11/1991 | United Kingdom . |

OTHER PUBLICATIONS

B. K. Wiecking et al., *Die Motoren der Personenkraftwagen*, Chr. Belser Verlag, 1952, p. 314.

Primary Examiner—Richard M. Lorence
Attorney, Agent, or Firm—Brumbaugh, Graves, Donohue & Raymond

[57] ABSTRACT

In order to secure the flywheel (5) of a motor vehicle friction clutch (3) to the output end of a crankshaft (23) of an internal combustion engine, it is proposed that the flywheel (5) is fastened to the output end of the crankshaft (23) by means of an axially detachable centric clamping arrangement (21). The flywheel (5) is hereby supported on a pipe end (37) of the crankshaft (23). Conical expansion elements (45), which may be axially displaced by means of a centric screw element (43) to generate radial clamping forces, are inserted into the centric cavity formed by the pipe end (37). The screw element (43) is structured in such a way that it may be screwed through the hub (27) of a clutch disc (9) of the friction clutch onto the crankshaft (23) by means of a screw attachment tool (51). The friction clutch (3) may thus be preassembled together with the flywheel (5) to form a structural unit before it is secured to the crankshaft (23) .

9 Claims, 2 Drawing Sheets

ARRANGEMENT FOR SECURING A CLUTCH TO A CRANKSHAFT

BACKGROUND OF THE INVENTION

The invention relates to an arrangement for coaxially securing an input component of a clutch, in particular of a friction clutch, to an output end of a crankshaft rotatable around an axis of rotation in an internal combustion engine of a motor vehicle.

Conventional friction clutches in motor vehicles generally include a single- or twin-part flywheel, onto which a pressure plate unit is detachably screwed. The pressure plate unit includes an axially movable contact plate, which is arranged to be rotationally fixed, but axially movable on a clutch housing screwed to the flywheel and is biased towards the flywheel by a pressure spring, usually a diaphragm spring. The contact plate and the flywheel form friction surfaces for a clutch disc arranged between them, the hub of which is supported to be rotationally fixed, but axially movable on an input shaft of a gear arranged downstream of it in the drive section of the motor vehicle. The flywheel is, moreover, screwed onto an end flange of the crankshaft of the internal combustion engine by means of a plurality of screws arranged around the axis of rotation of the crankshaft.

Viewed in axial direction, the clutch disc and the diaphragm spring in conventional friction clutches cover the screws securing the flywheel to the end flange of the crankshaft. Consequently, when assembling a friction clutch the flywheel must first be screwed onto the end flange, before the clutch disc can be put in place and the pressure plate unit can be screwed onto the flywheel. This assembly procedure is not only time-consuming, but also has the disadvantage that the friction clutch cannot be checked prior to assembly overall, that is including the clutch disc and the flywheel, to determine whether assembly regulations have been complied with.

From DE-A 41 17 571 it is known to arrange holes in both the clutch disc and the diaphragm spring, which are axially flush with the screws provided for securing the flywheel to the end flange of the crankshaft. In this way, the pressure plate unit can be assembled together with the clutch disc and the flywheel to form one structural unit, hereafter also referred to as a modular clutch, prior to installation on the crankshaft. The fastening screws may be tightened through the holes in the clutch disc and the diaphragm spring into the end flange of the crankshaft.

It is known from DE-A 33 15 232 to screw a friction clutch comprising flywheel, pressure plate unit and clutch disc, whereby the clutch housing borders the flywheel, i.e. is not detachably connected thereto, to the output end of the crankshaft by means of a central screw. The output end of the crankshaft contains a centric front opening provided with an internal thread, into which the central screw is screwed. The central screw has a radially projecting flange, which clamps the flywheel against the axial face of the output end of the crankshaft. The torque, which may be transmitted via the radial flange of the central screw, is however comparatively low, since only restricted fastening torques of the central screw may be achieved.

It is known from DE-A 40 13 298, for securing the flywheel of a friction clutch, to provide the axially facing surfaces of an end flange of the crankshaft and the flywheel with a radial gear tooth system (Hirth serration), and to axially fix the flywheel to the output end of the crankshaft by means of a central screw. The central screw is provided with centric key faces to accommodate a screw attachment tool.

It is known from the book .Die Motoren der Personenkraftwagen. (Automobile Engines), by K. Wiecking and R. Gebauer, Verlag Chr. Belser, Stuttgart, 1952, page 314, FIG. 341, to secure the flywheel of a conventional friction clutch to the output end of the crankshaft of an internal combustion engine by means of a cone press-fit joint. The output end bears an external cone tapering towards the clutch disc, on which the flywheel is mounted by an internal cone of its hub. The output end of the crankshaft ends in a screw journal, onto which a nut locking the flywheel is screwed.

Finally, it is known from the German Gebrauchsmuster 90 16 961 to provide a clamping joint between a shaft rotating around an axis of rotation and the hub of a component concentric to the axis of rotation. Conical elements are distributed over the periphery of the hub in conical recesses, and may be tightened in axial direction into the corresponding recesses by means of screws. The conical elements cause radial deformation of the hub and thus generate clamping forces acting on the shaft.

SUMMARY OF THE INVENTION

The invention provides an easy to handle and nonetheless operationally safe arrangement to coaxially secure an input component of a clutch, in particular a friction clutch, to an output end of a crankshaft, which is rotatable around an axis of rotation, in an internal combustion engine of a motor vehicle.

This aim is achieved according to the invention in that the output end of the crankshaft is in the form of a pipe end concentric to the axis of rotation, onto which pipe end the input component of the clutch with a centric hub opening is mounted, and that conical expansion elements are inserted in a centric cavity formed by the pipe end, which may be axially displaced by means of a centric screw element to generate radial clamping forces.

In this way, a clamping joint between the input component of the clutch and the output end of the crankshaft may be provided or released again by a single screw element. This not only simplifies handling, but also the manufacture of the fastening arrangement, since all the components required here extend concentrically to the axis of rotation of the crankshaft and can therefore be manufactured simply and precisely.

The clutch is preferably a friction clutch, but hydrodynamic clutches or torque converters may also be secured in the same manner. The input component concerned may be a flywheel of the internal combustion engine, which can be a one-mass flywheel or a flywheel having two masses which may be rotated relative to one another around the axis of rotation. The term conical expansion elements relates to any elements, which permit radial expansion forces to be exerted on the pipe end by means of axial displacement of the expansion elements in relation to the pipe end, e.g. conical spreaders which may be drawn into the cavity by means of the screw element. The screw element may in this case be screwed to the pipe end or an adjacent area of the output end of the crankshaft.

Both the conical expansion elements and the screw element can be separate structural components in this case. However, in an expedient embodiment these components form an integral part. The screw element in this case has a conical external thread to form the conical expansion elements and is screwed into an internal thread of the pipe end. The pipe end preferably has at least one radially continuous slot extending axially at least over a part of the pipe end. This ensures higher elasticity in radial direction so that an acceptable clamping joint may be produced even where the starting torque of the screw element is comparatively low. For expedience, several slots may be provided over the periphery.

The pipe end preferably has an axial stop for the input components of the clutch. This ensures that the axial position of the clutch is exact before the clamping joint is closed.

The outer casing of the pipe end and the inner casing of the hub opening of the input component are advantageously cylindrical. Such joint surfaces may be produced accurately with sufficiently low tolerances to prevent tilting errors and suchlike. However, it can be expedient to improve the impact stability of the clamping joint by providing the outer casing of the pipe end with an external thread and the inner casing of the hub opening of the input component with an internal thread screwed onto the external thread. In this embodiment, the input component is screwed onto the pipe end before the clamping joint is closed. This type of fastening provides a joint which is not only frictionally engaged but also positive-locking and is particularly secure, especially in the case of sporadic or sudden load application.

The arrangement according to the invention for securing the clutch to the crankshaft is particularly suitable for modular clutches, i.e. friction clutches, in which the clutch disc acting as output component of the friction clutch is joined together with the flywheel and the pressure plate unit comprising the contact plate, the clutch housing and the pressure spring, to form a structural unit prior to installation of the friction clutch. The screw element is in this case expediently provided with tool working surfaces, which through a hub opening in the clutch disc provided for coupling with a gear input shaft, are accessible for a screw attachment tool which may be inserted axially through the hub opening. In this way the expansion elements, which are initially only provisionally fixed to the crankshaft by means of the screw element, may be centrically clamped through the hub opening of the clutch disc after mounting of the clutch component. The clamping joint is clamped and released in a single work step. The screw element is preferably provided with a centric contoured hole to accommodate the screw attachment tool to allow better guidance of said tool. The contoured hole and the hub opening of the clutch disc expediently have like cross-sectional contours, generally in the form of an internal gear tooth system, and this simplifies manufacture and guidance of the screw attachment tool in the hub opening of the clutch disc, with a suitable tool design.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 shows a motor vehicle friction clutch 3 rotating during operation around an axis of rotation 1 with a flywheel 5, a pressure plate unit 7 and a clutch disc 9. The pressure plate unit 7 comprises a clutch housing 11, which is secured detachably or undetachably to the flywheel 5, a contact plate 13, which is attached in a manner not shown in more detail, e.g. by means of tangential leaf springs, so that it is rotationally fixed but axially movable on the clutch housing 11, and a pressure spring, in this case in the form of a diaphragm spring 15. The diaphragm spring clamps the contact plate 13 against the flywheel 5 forming a matching contact plate by means of friction linings 17 of the clutch disc 9. The friction linings 17 are disengaged and the friction clutch 3 is released by axial movement of the tongues 19 of the diaphragm spring 15.

Figure 1:
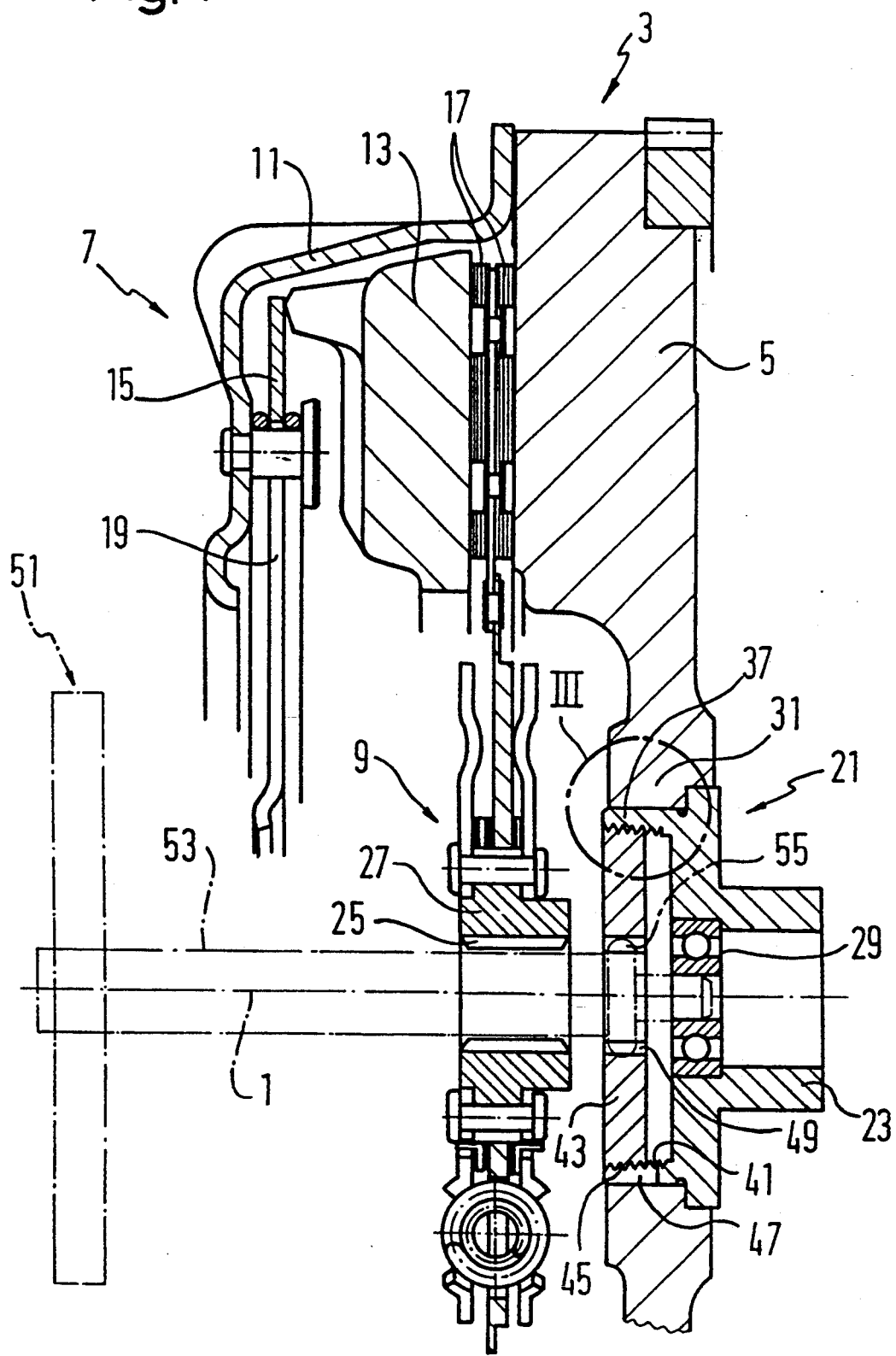
FIG. 1 shows a partially axial longitudinal section through a motor vehicle friction clutch in the form of a modular clutch having a clamping joint between the flywheel and crankshaft.

The flywheel 5 is detachably secured to the output end of a crankshaft 23 rotating around axis 1 in a motor vehicle internal combustion engine, which is not shown in further detail. The clutch disc 9 itself has a hub 27 provided with an internal toothing 25, by means of which the clutch disc 9 is coupled so that it is rotationally fixed but axially movable on an input shaft of a motor vehicle shift transmission (not shown in further detail), which may be arranged in a pilot bearing 29 of the crankshaft. The friction clutch 3 is what is known as a modular clutch., which may be installed in one work step on the crankshaft 23 as a preassembled, complete structural unit comprising the pressure plate unit 7 as well as the flywheel 5 and the pressure plate unit 7 as well as the flywheel 5 and the clutch disc 9. During preassembly, the clutch housing 11, diaphragm spring 15, contact plate 13 and clutch disc 9 are preassembled, whereby the clutch disc 9 has already been centered. The entire structural unit 5, 9, 11, 13 and 15 may then be mounted on the output end of the crankshaft 23 and secured to the crankshaft 23 in one work step by means of the clamping arrangement 21.

Figure 3:
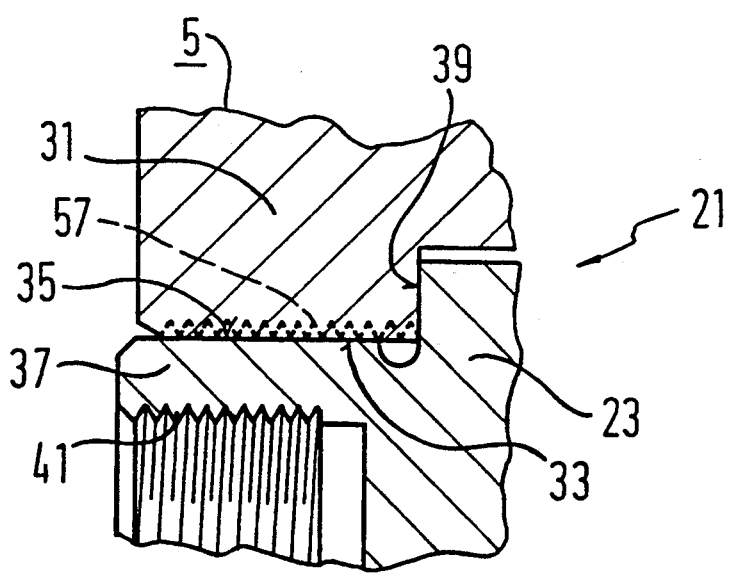
FIG. 3 shows a detail of the clamping area along arrow III in FIG. 1.

As shown best in FIG. 3, the flywheel 5 has a hub 31 with a centric, cylindrical hub opening 33, with which it is mounted on a cylindrical outer surface 35 of an axially protruding, centric pipe attachment 37 of the crankshaft 23 at the output end of the crankshaft 23 to form a narrow pass. An axial stop 39 of the crankshaft 23 positions the flywheel 5 in axial direction.

Figure 2:
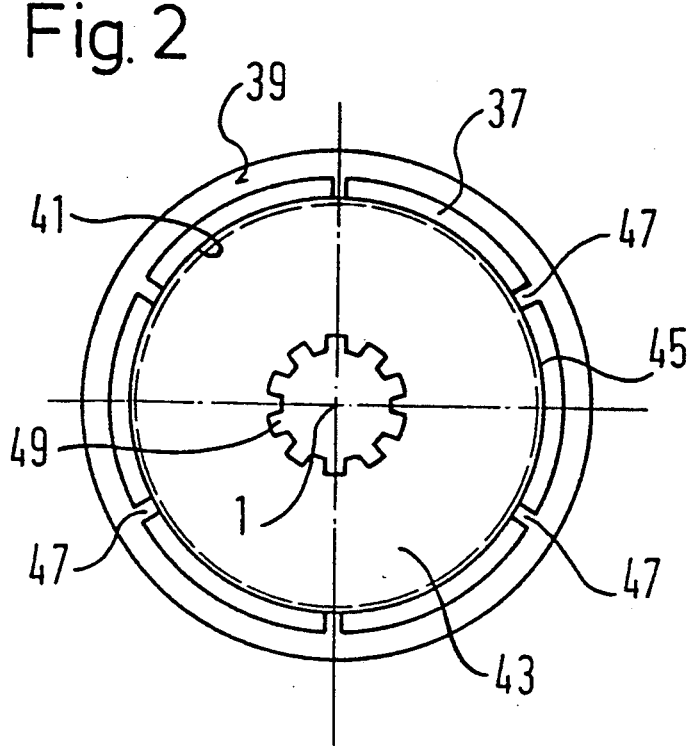
FIG. 2 shows a front view of the crankshaft with a screw element already in place in preparation for securing the flywheel.

The inner circumferential surface of the pipe attachment 37 is provided with an approximately conical internal thread 41, into which is inserted a screw element 43 (FIGS. 1 and 2) concentric to the axis of rotation 1. The screw element 43 has an approximately conical external thread 45 on its outer periphery, which is screwed into the internal thread 41 of the pipe end 37 with its smaller diameter first. The screw element 43 expands the pipe end 37 radially. The radial compressive forces generated hereby frictionally engage the hub 31 of the flywheel 5 at the output end of the crankshaft 23. To increase its radial flexibility, the pipe end 37 is provided with radially continuous slots 47 extending axially at least over part of the length of the pipe end 37. The slots 47 are distributed in peripheral direction and, if need be, may all be omitted. For installation of the modular clutch, the screw element 43 is essentially loosely inserted into the pipe end 37 and then the flywheel 5 of the modular clutch 3 is mounted on the pipe end 37. The screw element 43 has a contoured centric hole 49, the cross-sectional contour of which is preferably the same as the cross-sectional contour of the inner tooth system 25 of the clutch disc 9, which means that the same production tools may be used for the manufacture of both the hub 27 and the screw element 43. In order to clamp the clamping joint 21, the shaft 53 of a screw attachment tool 51 is first passed through the hub 27 of the clutch disc 9 into the contoured hole 49 of the screw element 43. The end of the shaft 53 is provided with a coupling contour 55 corresponding to the contoured hole 43. The screw element 43 is screwed through the hub 27 of the clutch disc 9 into the pipe end 37 by means of the screw attachment tool 51, whereby the pipe end 37 expands and the clamping joint between the pipe end 37 and the hub 31 of the flywheel 5 is clamped. The shafts 53 of the screw attachment tool 51 may in this case be guided in the pilot bearing 29 with a suitable extension, to ensure that the fastening procedure is carried out with a high degree of precision. After the clamping joint 21 has been clamped, the screw attachment tool 51 is withdrawn so that the shift transmission may be installed with its input shaft first into the modular clutch.

The inner surface of the opening 33 of the hub 31 of the flywheel 5 and the outer surface 35 of the pipe end 37 may each be in the form of smooth cylindrical joint surfaces so that the flywheel 5 is exclusively engaged frictionally on the pipe end 37. As indicated at 57 in FIG. 3, however, the outer surface 35 and the inner surface 33 may also be provided with a thread. The flywheel 5 is in this case screwed onto the pipe end 37 until it abuts the stop shoulder 39 before the clamping joint 21 is clamped and is thus both frictionally and positively engaged on the crankshaft 23 after the clamping arrangement 21 is clamped. The clamping arrangement 21 explained above permits the modular clutch 3 including the flywheel 5 to be fastened quickly and securely to the crankshaft 23. In the same way, the modular clutch 3 may also be very easily released from the crankshaft 23 again. It goes without saying that in modular clutches 3 with a detachable pressure plate unit 7 on the flywheel 5, the pressure plate unit 7 may be removed as well as a unit from the flywheel 5, as is usual in conventional clutches.

In the embodiments explained above, the conical external thread 45 of the screw element 43 forms an integral part with expansion elements connected thereto for radial expansion of the pipe end 37. It goes without saying that these expansion elements may possibly also be separate from the screw element, for example in the form of an additional cone element, which is then drawn into the pipe end 37 by the screw element, which may be screwed to the crankshaft 23 by means of a standard cylindrical thread.

While specific embodiments of the invention have been shown and described in detail to illustrate the application of the inventive principles, it will be understood that the invention may be embodied otherwise without departing from such principles.

What we claim is:

1. In an arrangement for coaxially securing an input component (5) of a clutch (3) to an output end of a crankshaft (23) rotatable around an axis of rotation (1) in an internal combustion engine of a motor vehicle, the output end of the crankshaft having a pipe end (37) with a centric cavity concentric to the axis of rotation (1) and the input component (5) having a concentric hub opening (33) to be seated on the pipe end (37); the improvement comprising:

a conically internally threaded section (41) carried by the pipe end (37) and surrounding said centric cavity; and a conically externally threaded centric screw element (43) to threadedly engage the conically internally threaded section (41) and, upon axial movement of the centric screw element (43) relative to the conically internally threaded section (41), to radially displace the conically internally threaded section (41) for generating radial clamping forces against the input component (5).

2. Arrangement according to claim 1, wherein the smaller diameter end of the screw element (43) is inserted first into the centric cavity.

3. Arrangement according to claim 1, wherein the pipe end (37) has at least one radially continuous slot (47) extending axially over at least part of the axial length of the pipe end (37).

4. Arrangement according to claim 1, wherein the pipe end (37) has an axial stop (39) for the input component (5).

5. Arrangement according to claim 1, wherein the pipe end (37) has an outer cylindrical surface (35) and the hub opening (33) of the input component (5) has an inner cylindrical surface (41) seated on the outer cylindrical surface.

6. Arrangement according to claim 1, wherein the pipe end (37) has an external thread (57) and the hub opening (33) of the input component (5) has an internal thread for engagement with the external thread (57).

7. Arrangement according to claim 1, wherein the clutch (3) is provided with a clutch disc (9) having a hub opening concentric to the axis of rotation (1), said clutch disc (9) and the input component (5) forming a structural unit preassembled prior to mounting the input component (5) to the pipe end (37), and wherein the improvement further comprises:

the screw element (43) being provided with tool work surfaces (49) which are accessible through the hub opening of the clutch disc (9) for a screw attachment tool (51) to be inserted axially through the hub opening of the clutch disc (9) to thread the screw element (43) into the internally threaded section (41) of the pipe end (37).

8. Arrangement according to claim 7, wherein the screw element (43) has a contoured centric hole (49) to accommodate the screw attachment tool (51) when being inserted concentrically to the axis of rotation (1).

9. Arrangement according to claim 8, wherein the contoured hole (49) and the hub opening of the clutch disc (9) have substantially the same cross-sectional contour.

* * * * *